(12) United States Patent
Yang et al.

(10) Patent No.: US 7,298,431 B2
(45) Date of Patent: Nov. 20, 2007

(54) LIQUID CRYSTAL DISPLAY DEVICE AND FABRICATING METHOD THEREOF

(75) Inventors: Joon-Young Yang, Gyeonggi-do (KR); Yong-In Park, Seoul (KR); Sang-Hyun Kim, Gyeonggi-Do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 387 days.

(21) Appl. No.: 11/015,019

(22) Filed: Dec. 20, 2004

(65) Prior Publication Data

US 2005/0140841 A1    Jun. 30, 2005

(30) Foreign Application Priority Data

Dec. 29, 2003    (KR) ...................... 10-2003-0099291

(51) Int. Cl.
*G02F 1/136* (2006.01)
*G02F 1/133* (2006.01)
*H01L 31/20* (2006.01)

(52) U.S. Cl. .................... 349/43; 349/139; 257/59; 257/72

(58) Field of Classification Search .................. 349/43, 349/187, 139; 257/59, 72
See application file for complete search history.

(56) References Cited

U.S. PATENT DOCUMENTS 6,166,785 A * 12/2000 Ha .................. 349/42
6,567,150 B1 * 5/2003 Kim ..................... 349/187
2005/0036080 A1 * 2/2005 Koide .................. 349/43
2005/0078240 A1 * 4/2005 Murade ................ 349/110
2005/0140871 A1 * 6/2005 Hwang ................ 349/114

FOREIGN PATENT DOCUMENTS

| CN | 1366206 | 8/2002 |
|---|---|---|
| CN | 1392965 | 1/2003 |
| JP | 10-123482 | 5/1998 |
| JP | 2001-296523 | 10/2001 |
| JP | 2002-023185 | 1/2002 |

\* cited by examiner

*Primary Examiner*—Toan Ton
(74) *Attorney, Agent, or Firm*—McKenna Long & Aldridge LLP

(57) ABSTRACT

A method for fabricating a liquid crystal display (LCD) device comprises forming an active pattern and a data line on a substrate, the active pattern including a source, a drain, and a channel regions; a first insulation film on a portion of the substrate; forming a gate electrode in a portion of the active pattern where the first insulation film is formed; a second insulation film on the substrate; forming a plurality of first contact holes exposing a portion of the source and drain regions and a second contact hole exposing a portion of the data line; forming a source electrode from a transparent conductive material connected to a source region within the respective first contact hole and a data line within the second contact hole; and forming a pixel and a drain electrodes from the transparent conductive material connected to a drain region within the respective first contact hole.

13 Claims, 15 Drawing Sheets

LIQUID CRYSTAL DISPLAY DEVICE AND FABRICATING METHOD THEREOF

This application claims the benefit of Korean Patent Application No. 2003-0099291 filed on Dec. 29, 2003, which is hereby incorporated by reference.

BACKGROUND OF THE INVENTION

1. Field of the Invention

The present invention relates to a liquid crystal display device and its fabricating method, and more particularly, to a liquid crystal display device and its fabricating method that reduces the number of mask processes in forming a thin film transistor.

2. Description of the Related Art

As demands for the information display device and the portable information display media is growing, research on a light-weight thin film type flat panel display (FPD) is becoming a trend of industry threatening the related art cathode ray tube (CRT) display device. One type of FPDs is a liquid crystal display (LCD), which displays an image using the optical anisotropy of liquid crystal material, is actively employed in notebook computers and a desktop monitors because of its high quality resolution, color display, and picture quality.

The LCD includes a color filter substrate (a first substrate), an array substrate (a second substrate), and a liquid crystal layer formed between the color filter substrate and the array substrate. A thin film transistor (TFT) is generally used as a switching device of the LCD and an amorphous silicon thin film or a polycrystalline silicon thin film is used as a channel layer of the TFT.

A fabrication process of the LCD generally requires a plurality of masking processes (namely, a photolithography process) for fabrication of the array substrate including the TFT. Accordingly, reducing the number of masking processes is necessary to increase a productivity.

The structure of a general LCD will now be described with reference to FIG. 1. FIG. 1 is a plan view showing a portion of the array substrate of the related art LCD. An actual LCD has N×M pixels with N gate lines intersecting M data lines. In FIG. 1, only one pixel is shown in the drawing to simplify the explanation.

As shown, in FIG. 1, the array substrate 10 includes a pixel electrode 18 formed on a pixel region, gate lines 16 and data lines 17 arranged vertically and horizontally on the substrate 10 to define a pixel electrode, and a TFT (the switching device) formed at the intersection of the gate line 16 and the data line 17.

The TFT includes a gate electrode 21 connected to the gate line 16, a source electrode 22 connected to the data line 17, and a drain electrode 23 connected to the pixel electrode 18. The TFT further includes a first insulation film (not shown) and a second insulation film (not shown) for insulating the gate electrode 21 and the source/drain electrodes 22 and 23, and an active pattern 24 for forming a conductive channel between the source electrode 22 and the drain electrode 23. The gate electrode 21 supplies a gate voltage at the conductive channel.

The source electrode 22 is electrically connected to a source region of the active pattern 24 and the drain electrode 23 is electrically connected to a drain region of the active pattern 24 through a plurality of first contact holes 40A defined through the first insulation film and the second insulation film. A third insulation film (not shown) having a second contact hole 40B is formed on the drain electrode 23 so that the drain electrode 23 and the pixel electrode 18 are electrically connected.

A process for fabricating the LCD as described above will now be explained with reference to FIGS. 2A to 2F. FIGS. 2A to 2F are sequential cross-sectional views showing a fabrication process of the LCD taken along line I-I of FIG. 1. The TFT in the related art uses polycrystalline silicon as a channel layer. With reference to FIG. 2A, an active pattern 24 made of a polycrystalline silicon thin film is formed on a substrate 10 using photolithography.

Next, as shown in FIG. 2B, a first insulation film 15A and a conductive metal material are disposed on the entire surface of the substrate 10 already provided with the active pattern 24. Thereafter, the conductive metal material is selectively patterned using photolithography, thereby forming a gate electrode 21 over the active pattern 24. The gate electrode 21 is insulated from the active pattern 24 by the gate insulation film 15A interposed therebetween.

Then, a high density impurity ion is injected into a desired portion of the active pattern 24. The gate electrode 21 is used as a mask to form p+ or n+ source/drain regions 24A and 24B. The source/drain regions 24A and 24B make an ohmic contact with source/drain electrodes. Subsequently, as shown in FIG. 2C, the second insulation film 15B is disposed on the entire surface of the substrate 10 already provided with the gate electrode 21, thereafter, a portion of the first and second insulation films 15A and 15B are removed to form a first contact hole 40A exposing a portion of the source/drain regions 24A and 24B.

Furthermore, as shown in FIG. 2D, a conductive metal material is disposed on the entire surface of the substrate 10 and then patterned by using photolithography process to form a source electrode 22 connected to the source region 24A and a drain electrode 23 connected to the drain region 24B through plurality of the first contact hole 40A. In this case, a portion of the conductive metal layer forming the source electrode 22 extends in a first direction to be connected with the data line 17.

As shown in FIG. 2E, after a third insulation film 15C is disposed on the entire surface of the substrate 10, a second contact hole 40B is formed to expose a portion of the drain electrode 23 by photolithography. Finally, as shown in FIG. 2F, a transparent conductive metal material is disposed on the entire surface of the substrate 10 already provided with the third insulation film 15C, and patterned by photolithography, thereby forming the pixel electrode 18 connected with the drain electrode 23 within the second contact hole 40B.

As described above, when fabricating the LCD, including the polycrystalline silicon TFT, a total of six photolithography processes are required to pattern the active pattern, the gate electrode, the first contact hole, the source/drain electrode, the second contact hole and the pixel electrode. The photolithography process is a series of processes to form a desired pattern on a thin film-deposited substrate, consisting of a plurality of processes including coating a photosensitive material, exposing the photosensitive material, and developing the photosensitive material. Accordingly, the plurality of photolithography processes contribute to a reduction in production yield and increase in TFT defects. Since a mask designed to form a pattern is costly, an, increase in the number of masks significantly increases the LCD fabrication cost.

SUMMARY OF THE INVENTION

Accordingly, the present invention is directed to a LCD device and fabricating method thereof that substantially obviates one or more of the problems due to limitations and disadvantages of the related art.

An object of the present invention is to provide an LCD device and its fabrication method capable of reducing the number of masks by simultaneously patterning an active pattern and a data line to fabricate a thin film transistor.

Another object of the present invention is to form an active pattern and a gate electrode simultaneously in single mask process using a diffraction exposure and ashing technique.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for fabricating a liquid crystal display (LCD) device comprises forming an active pattern and a data line on a substrate, the active pattern including a source region, a drain region, and a channel region; disposing a first insulation film on a portion of the substrate; forming a gate electrode in a portion of the active pattern where the first insulation film is formed; disposing a second insulation film on the substrate; forming a plurality of first contact holes to expose a portion of the source and drain regions and a second contact hole to expose a portion of the data line; forming a source electrode from a transparent conductive material connected to a source region within one of the plurality of first contact holes and a data line within the second contact hole; and forming a pixel electrode and a drain electrode from the transparent conductive material connected to a drain region within the other one of the plurality of first contact holes.

In another aspect, a method for fabricating an liquid crystal display (LCD) device comprises disposing a silicon layer on a substrate; disposing a conductive metal layer on the silicon layer; patterning the conductive metal layer and the silicon layer to form an active pattern and a data line, the active pattern includes a source region, a drain region and a channel region; disposing a first insulation film on a portion of the substrate; removing the first insulation film and the conductive metal layer disposed in a portion of the active pattern; disposing a second insulation film on the substrate; forming a gate electrode in a portion of the active pattern where the second insulation film has been disposed; disposing a third insulation film on a portion of the substrate; forming a plurality of first contact holes defined through the second and third insulation films to expose a portion of the source and drain regions; forming a second contact hole defined through the first, second, and third insulation films to expose a portion of the data line; forming a source electrode connected to the source region within one of the plurality of first contact holes and a data line within the second contact hole; and forming a pixel electrode and a drain electrode connected to the drain region within the other one of the plurality of first contact holes.

In another aspect, an liquid crystal display (LCD) device comprises an active pattern formed of a silicon layer on a substrate, and having a source region, a drain region and a channel region; a data line formed as a double layer of the silicon layer and a conductive metal layer; a first insulation film formed on a portion of the substrate; a gate electrode formed in a portion of the active pattern on the first insulation film; a second insulation film formed on the substrate; and a source electrode connected to the source region and a drain electrode connected to the drain region within a plurality of first contact holes defined though the first and second insulation films.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

An active matrix (AM) structure includes a driving mechanism to drive liquid crystal material of a pixel unit using a thin film transistor (TFT) as a switching device. In such active matrix structure, amorphous silicon or polycrystalline silicon is used as a channel layer of the TFT. A concept of an amorphous silicon thin film transistor technique was established by LeComber et al. of England in 1979 and then was put to practical use as a 3-inch liquid crystal portable TV in 1986. Recently, a TFT LCD having a size greater than 50 inches has been developed.

However, an electric mobility (~1 $cm^2/Vsec$) of the amorphous silicon thin film transistor is limited in its application to a peripheral circuit which requires a fast clock operation of 1 MHz or higher. Thus, integrating a pixel unit and a driving circuit unit on a glass substrate simultaneously by the polycrystalline silicon TFT is taking attention from researchers because the polycrystalline silicon TFT has greater field effect mobility than the amorphous silicon TFT.

The polycrystalline silicon thin film transistor technique has been applied to a compact module such as a camcorder since liquid crystal color TV was developed in 1982. Due to a low photo sensitivity and high field effect mobility, the polycrystalline silicon thin film transistor includes the driving circuit that can be directly fabricated on a substrate. In particular, increased mobility enhances an operation frequency of a driving circuit unit which determines the number of driving pixels. In addition, reduction of time taken to change a signal voltage of the pixel unit reduces a distortion of a transmission signal, thereby improving picture. Moreover, the polycrystalline silicon TFT can be driven with a voltage smaller than 10V compared to the amorphous silicon thin film transistor which requires a high driving voltage (~25V), thereby saving a power consumption.

However, due to an increased number of photolithography processes required to fabricate an LCD including the polycrystalline silicon TFT, the fabrication cost increases. To solve this problem, the number of photolithography processes, specifically, the number of masks used, needs to be reduced. Accordingly, the present invention provides a LCD device and its fabrication method in which first and second contact holes are formed masking process at the same time by simultaneously pattering the active pattern and the data line, thereby reducing the number of masks.

The LCD device and its fabrication method in accordance with a preferred embodiment of the present invention will now be described with reference to the accompanying drawings.

Figure 1:
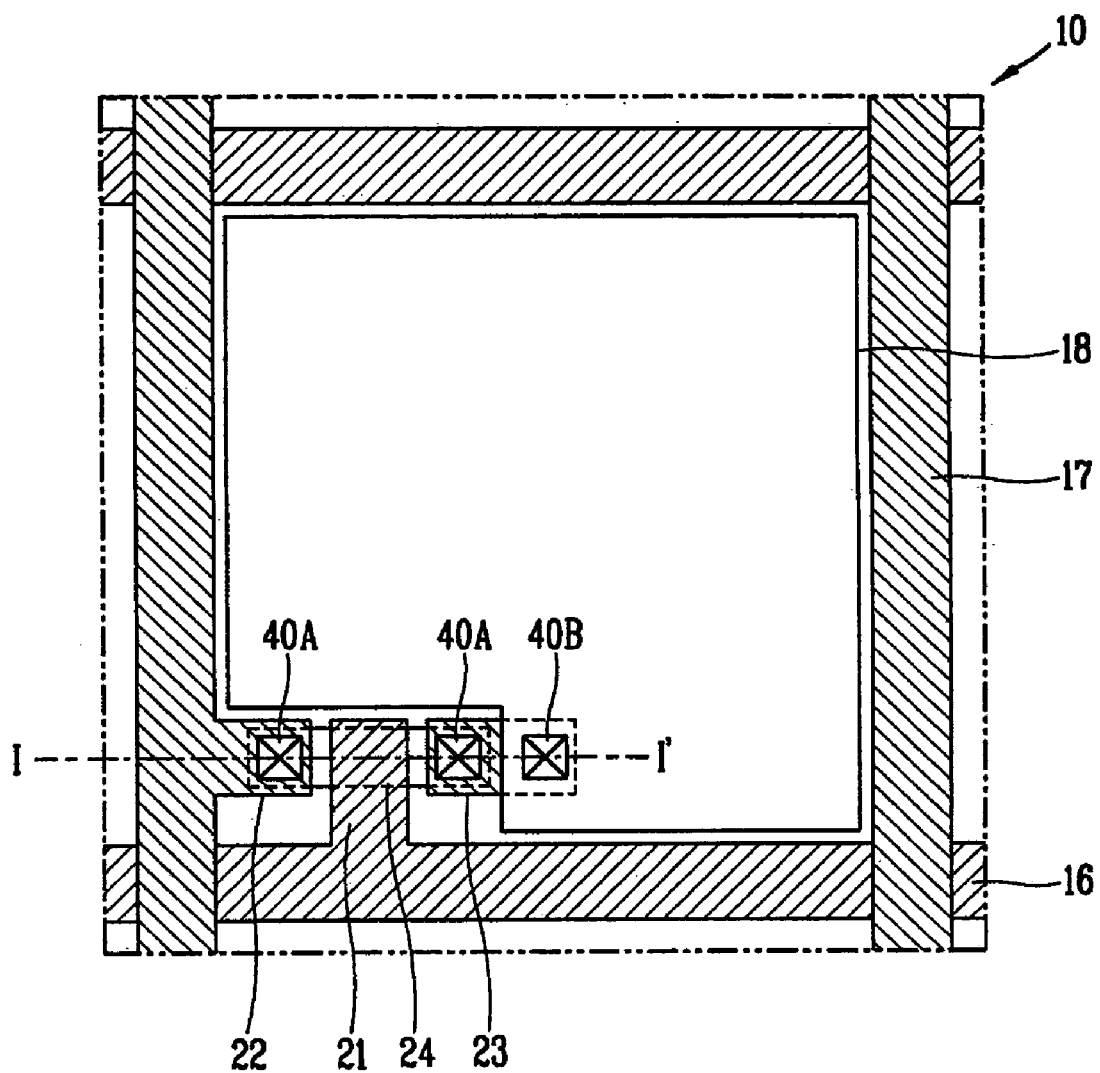
FIG. 1 is a plan view showing a portion of an array substrate of the related art LCD.
Figure 2A:
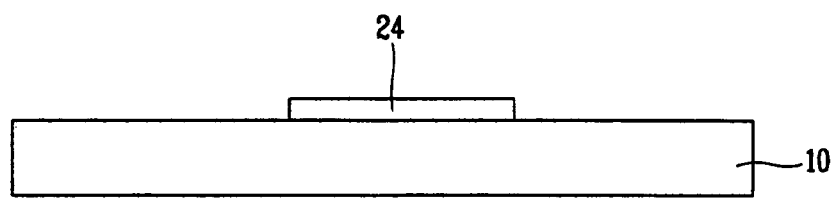
FIGS. 2A to 2F are cross-sectional views showing step-by-step fabrication process of the LCD taken along line I-I' of FIG. 1.
Figure 2B:
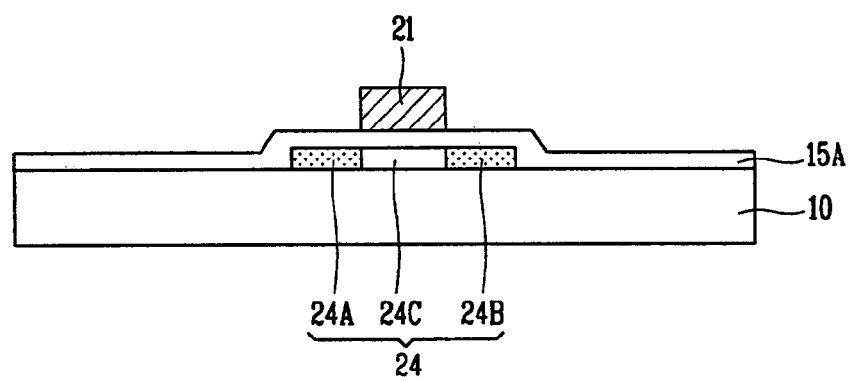
Figure 2C:
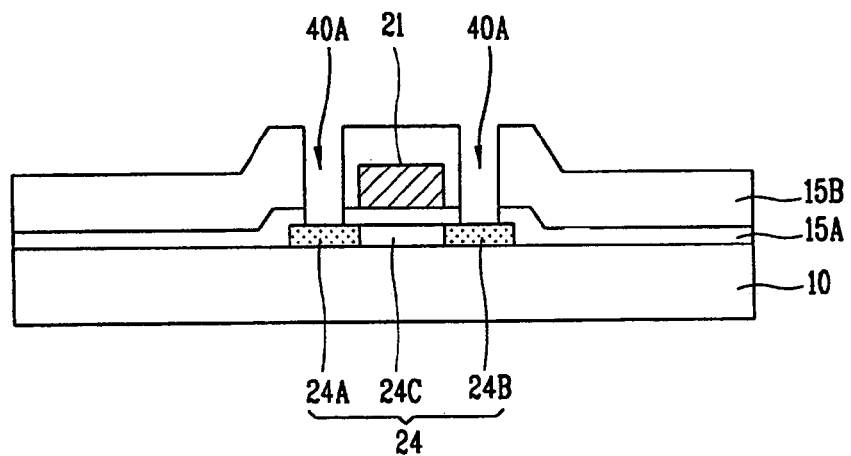
Figure 2D:
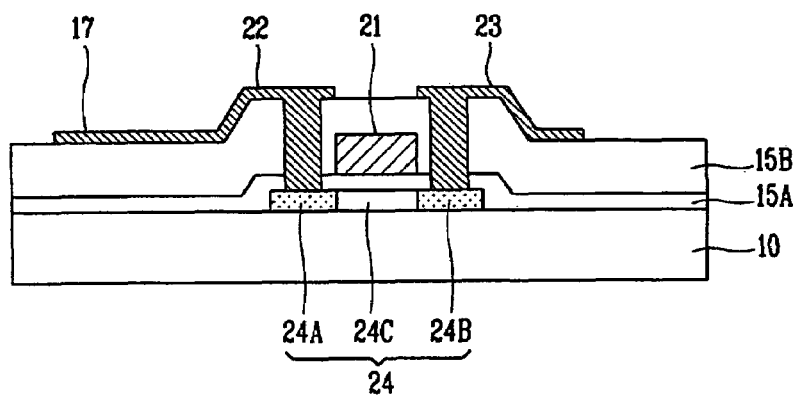
Figure 2E:
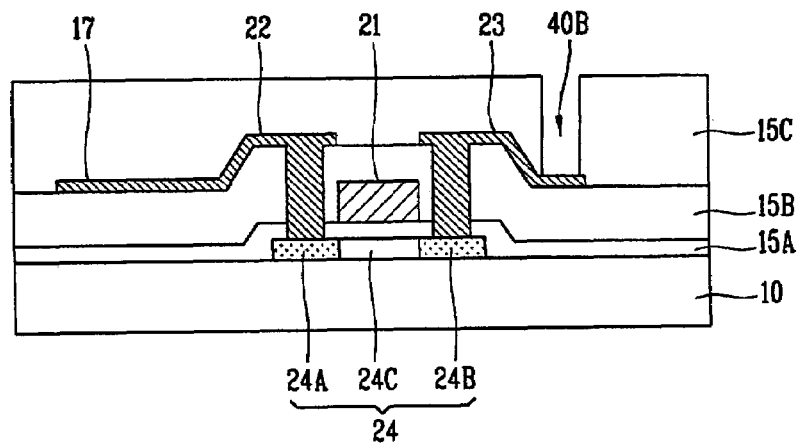
Figure 2F:
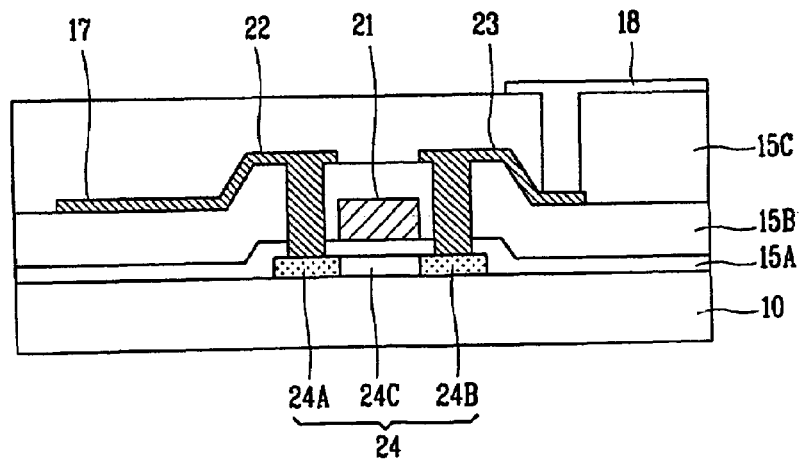
Figure 3:
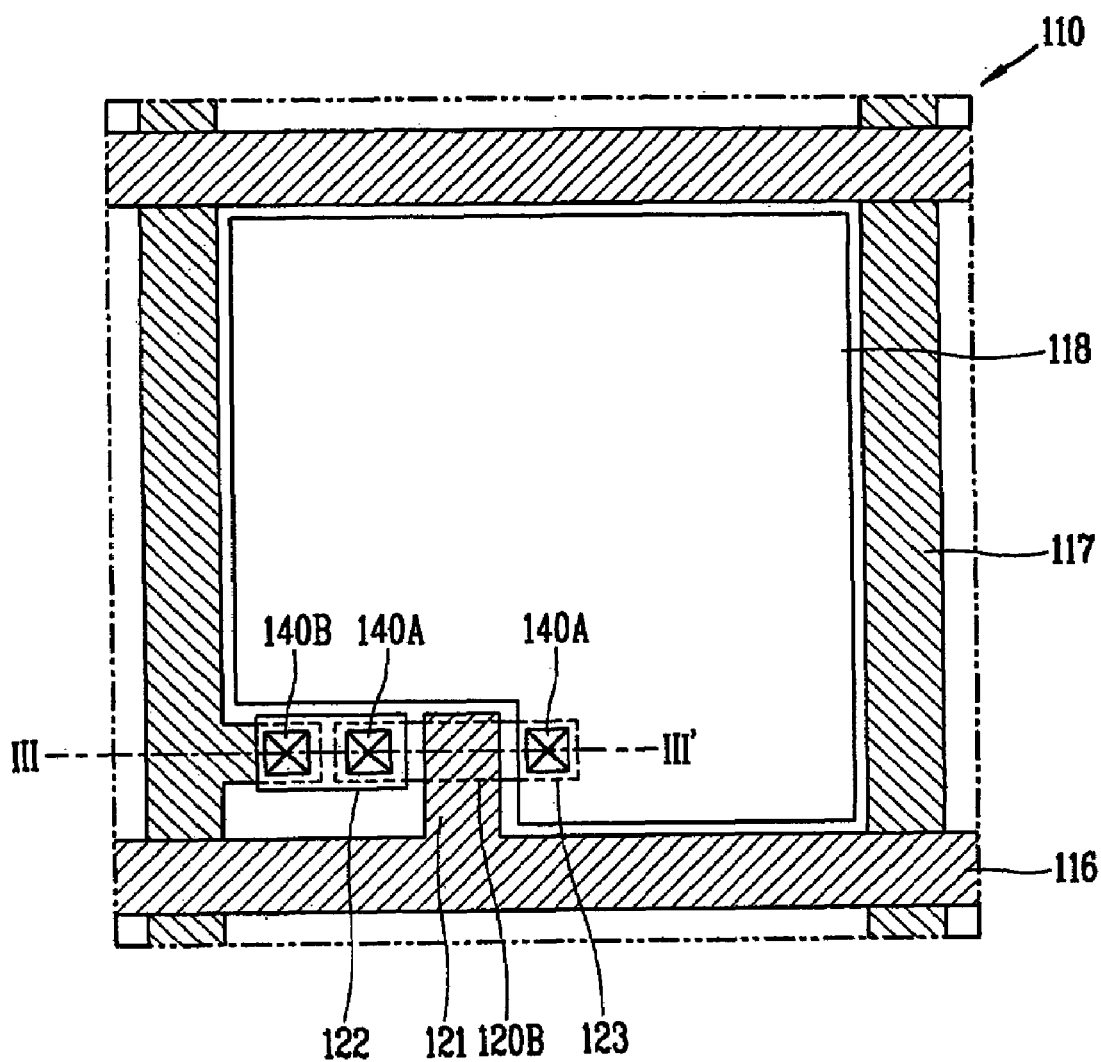
FIG. 3 is a plan view showing a portion of an array substrate of an LCD in accordance with a first exemplary embodiment of the present invention.

FIG. 3 is a plan view showing a portion of an array substrate of a LCD device in accordance with a first exemplary embodiment of the present invention. A LCD device of the first embodiment includes N×M pixels formed by N gate lines and M data lines intersecting each other. For convenience, only a single pixel is shown in FIG. 3.

The first embodiment of the present invention implements a polycrystalline silicon TFT using a polycrystalline silicon thin film as a channel layer. However, choice of channel layer is not limited thereto, and an amorphous silicon thin film can be also used as the channel layer. As shown in FIG. 3, gate line 116 and data line 117 are formed on an array substrate 110. The gate line 116 intersects data line 117, thereby defining pixel regions.

A TFT, working as a switching device, is formed at the intersection of the gate line 116 and the data line 117. A pixel electrode 118 connected to the TFT is formed in the pixel region to drive liquid crystal material (not shown). A common electrode of a color filter substrate (not shown) also is formed in the pixel region and connected to the TFT.

The TFT includes a gate electrode 121 connected to the gate line 116, a source electrode 122 connected to the data line 117, and a drain electrode 123 connected to the pixel electrode 118. The TFT further includes the second and third insulation films (not shown) to insulate the gate electrode 121, the source/drain electrodes 122, 123, and an active pattern 120B. An active pattern 120B forms a conductive channel between the source electrode 122 and the drain electrode 123 where a gate voltage is supplied to the gate electrode 121.

The source electrode 122 is electrically connected to the source region of the active pattern 120B within one of the plurality of first contact holes 140A defined through the second and third insulation films, and the drain electrode 123 is electrically connected to the drain region of the active pattern 120B within the other one of the plurality of first contact holes 140A. A portion of the source electrode 122 is electrically connected to the data line 117 within the second contact hole 140B defined through the first, second and third insulation films, and a portion of the drain electrode 123 is extended into the pixel region to form the pixel electrode 118.

By patterning the active pattern 120B and the data line 117 in the same masking process, and furthermore forming the pixel electrode 118, the source/drain electrodes 122 and 123 from the same material, the number of masks can be reduced while fabricating the TFT. A fabrication process of the TFT will be described in detail next.

FIGS. 4A to 4E are sequential cross-sectional views taken along line III-III' of the LCD of FIG. 3, and FIGS. 5A to 5E are plan views showing a step-by-step fabrication process of an LCD according to the first embodiment of the present invention.

Figure 4A:
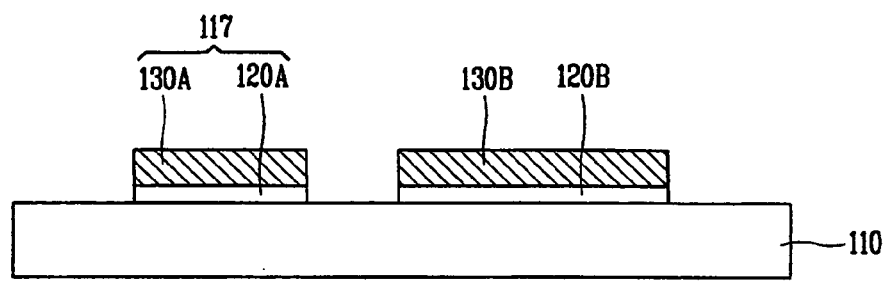
FIGS. 4A to 4E are sequential cross-sectional views taken along line III-III' of the LCD of FIG. 3.
Figure 5A:
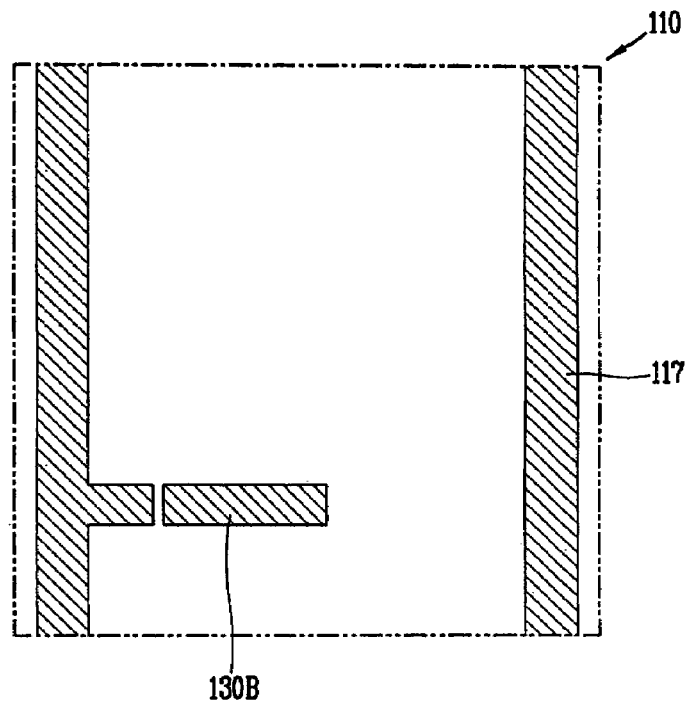
FIGS. 5A to 5E are plan views showing step-by-step fabrication process of an LCD in accordance with the first embodiment of the present invention.

As shown in FIGS. 4A and 5A, the active pattern 120B and the data line 117 are simultaneously patterned by a photolithography process (the first masking process) on the substrate 110. The substrate 110 is made of a transparent insulation material such as glass.

Figure 4B:
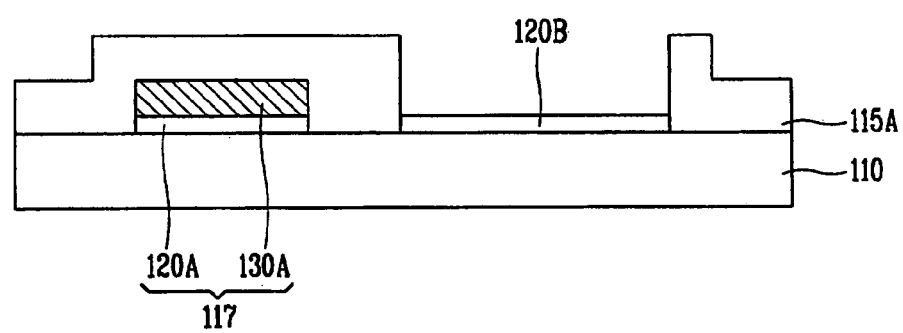
Figure 5B:
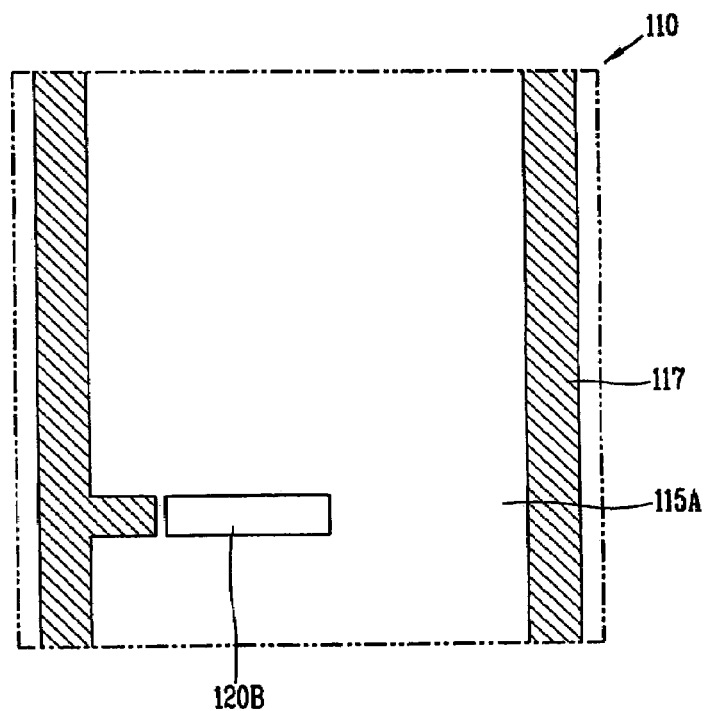

The data line 117 includes a first data line pattern 120A formed of a silicon layer 120 which also forms the active pattern 120B and a second data line pattern 130A formed of a conductive metal material. The conductive metal material pattern 130B remains on the upper portion of the active pattern 120B. As shown in FIGS. 4B and 5B, the first insulation film 115A is disposed on the entire surface of the substrate 110. Thereafter, the first insulation film 1115A and the conductive metal material pattern 130B are removed by the photolithography process (the second masking process), thereby exposing the surface of the active pattern 120B.

The first and second masking processes, namely, the process of simultaneously forming the data line and the active pattern will be described in detail as follows.

FIGS. 6A to 6E are cross-sectional view showing a process of simultaneously forming an active pattern 120B and a data line 117 of FIGS. 4A and 4B in accordance with the first embodiment of the present invention.

Figure 6A:
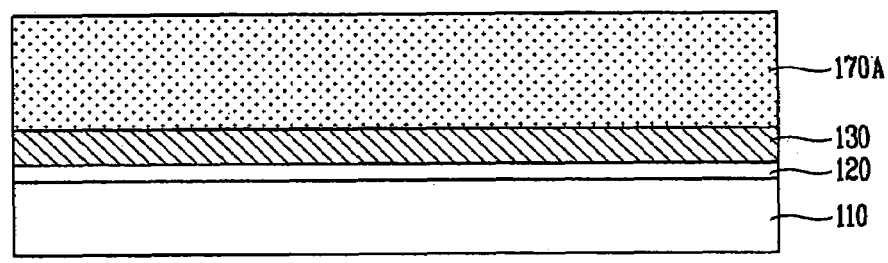
FIGS. 6A to 6E are cross-sectional view showing a process of simultaneously forming an active pattern and a data line of FIGS. 4A and 4B in accordance with the first embodiment of the present invention.

As shown in FIG. 6A, a silicon layer 120 is disposed on the substrate 110. The silicon layer 120 can be formed of an amorphous silicon thin film or a crystallized silicon thin film. In the first embodiment of the present invention, the TFT is formed by a crystallized polycrystalline silicon thin film. The polycrystalline silicon thin film is formed through several crystallization methods after the amorphous silicon thin film is deposited on the substrate 110. The method of forming the polycrystalline silicon thin film will be described next.

First, the amorphous silicon thin film is deposited by a low pressure chemical vapor deposition (LPCVD) or a plasma enhanced chemical vapor deposition (PECVD). Thereafter, a dehydrogenation process is performed to remove hydrogen atom existing in the amorphous silicon thin film, and then, crystallization is performed. The methods for crystallizing the amorphous silicon thin film include a solid phase crystallization (SPC) for heat-treating the amorphous silicon thin film at a high temperature in a furnace and an eximer laser annealing (ELA) method using laser. Laser crystallization, such as ELA, commonly uses a pulse form laser. Recently, a sequential lateral solidification (SLS) which improves the crystallization characteristics by growing crystal grains in a horizontal direction has been proposed.

SLS takes advantage of the fact that crystal grains grow in a vertical direction to a boundary face between liquid phase silicon and solid phase silicon (Robert S. Sposilli, M. A. Crowder, and James S. Im, Mat. Res. Soc. Symp. Proc. Vol. 452, 956~957, 1997). In the SLS, the size of the silicon grains can be enhanced by growing grains laterally up to a certain length. Proper control of laser energy size and an irradiation range of laser beam are required to achieve this result.

A conductive metal material 130 such as aluminum, an aluminum alloy, tungsten (W), copper (Cu), chromium (Cr) or molybdenum (Mo) is deposited on the entire surface of the substrate 110. The conductive metal material 130 forms the data line 117.

Figure 6B:
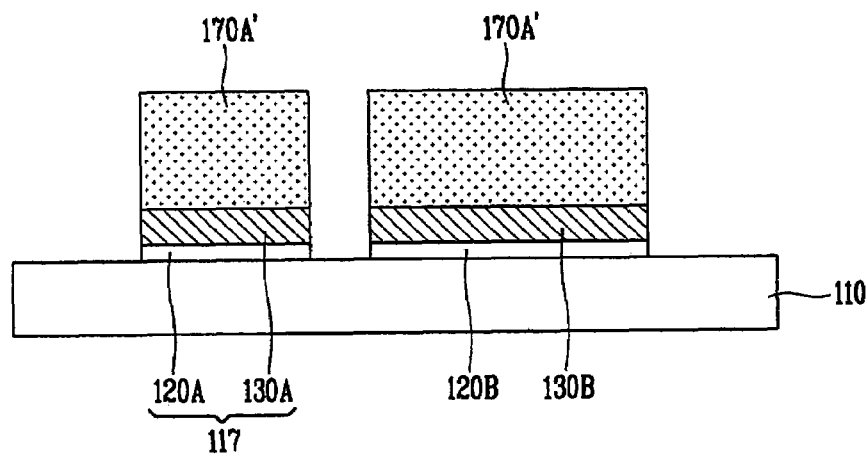
Figure 6C:
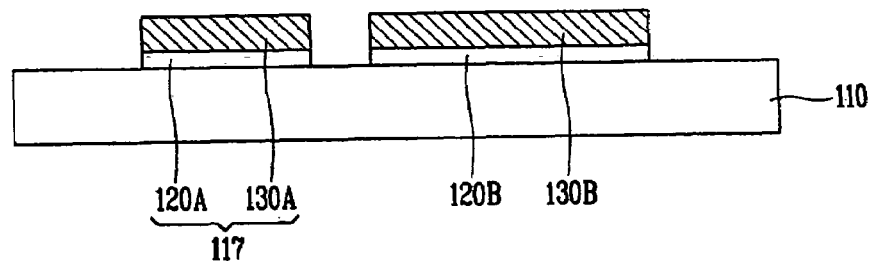

Thereafter, the first photosensitive film 170A made of a photosensitive material, such as photoresist, is disposed on the entire surface of the substrate 110. As shown in FIGS. 6B and 6C, after light is selectively irradiated and developed on the first photosensitive film 170A, the conductive metal material 130 and the silicon layer 120 are patterned simultaneously to form the active pattern 120B and the data line 117 through one-time masking process. At this time, the data line 117 includes the first data line pattern 120A formed of the silicon layer which also forms the active pattern 120B and the second data line pattern 130A formed of the conductive metal material. The conductive metal material pattern 130B having the same pattern as the active pattern 120B remains on the upper portion of the active pattern 120B.

Figure 4C:
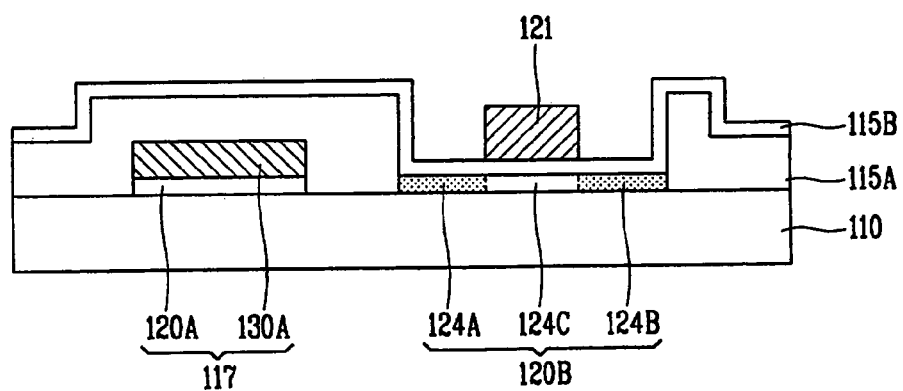
Figure 5C:
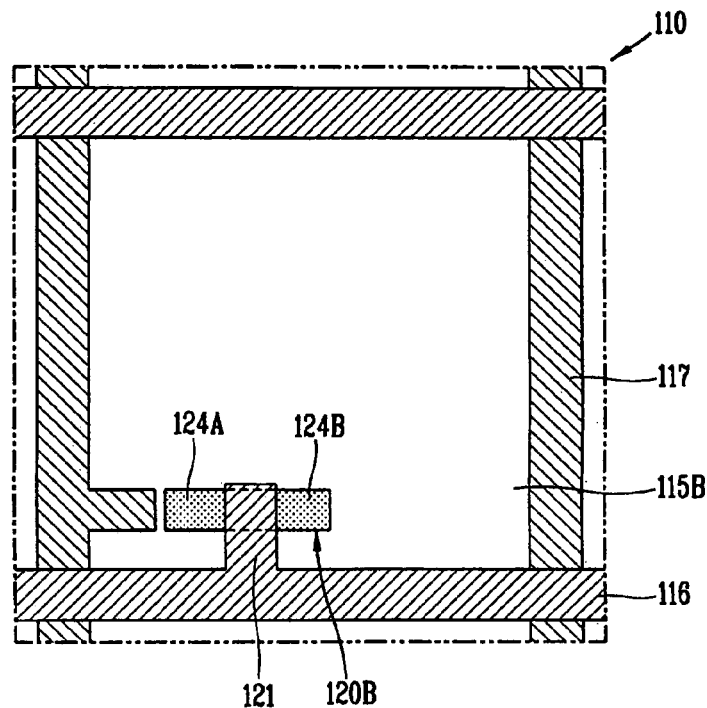
Figure 6D:
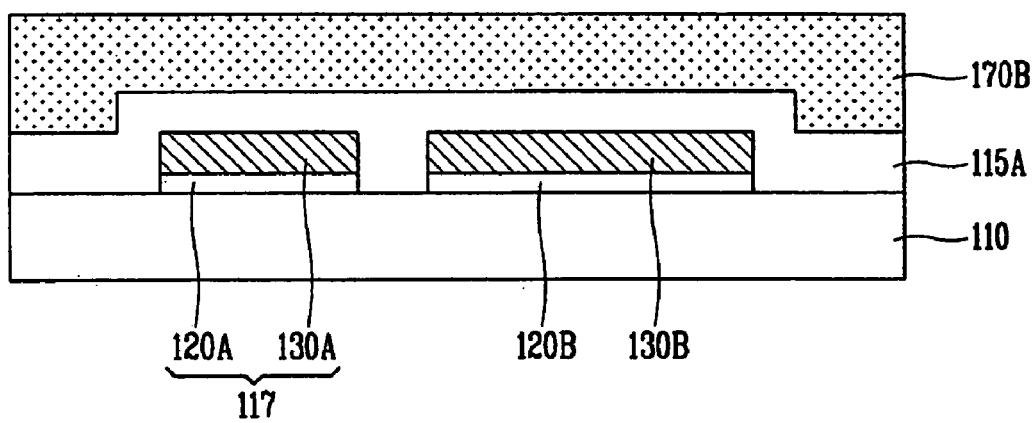
Figure 6E:
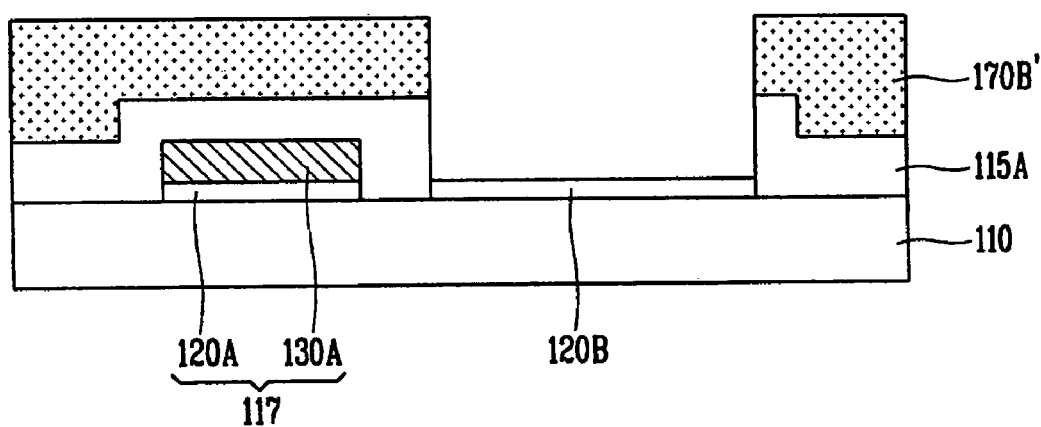

Then, as shown in FIG. 6D, the first insulation film 115A and the second photosensitive film 170B are disposed on the entire surface of the substrate 110. Thereafter, as shown in FIG. 6E, the second photosensitive film 170B is exposed and developed using a mask whose size is as large as or larger than the active pattern 120B to form the second photosensitive pattern 170B'. Then, when the first insulation film 115A and the conductive metal material pattern 130B are removed using the second photosensitive film pattern 170B' as a mask, the active pattern 120B is exposed. Next, as shown in FIGS. 4C and 5C, the second insulation film 115B are disposed on the entire surface of the substrate 110. The second insulation film 115B can be formed relatively thinner than the first insulation film 115A.

After the gate electrode 121 is formed at an upper portion of the active pattern 120B where the second insulation film 115B has been disposed (the third masking process), an impurity ion is injected to a certain region of the active pattern 120B using the gate electrode 121 as a mask, thereby forming the source region 124A, and drain regions 124B, and channel region 124C. In this case, the gate electrode 121 serves as an ion stopper which prevents an infiltration of a dopant into the channel region 124C of the active pattern 120B. The electrical characteristics of the active pattern 120B vary according to a type of an injected dopant. If the injected dopant corresponds to a group III element such as boron, the active pattern 120B operates as a P-type TFT, and if the injected dopant corresponds to a group V element, the active pattern 120B operates as an N-type TFT. A process for activating the injected dopant can be performed after the ion injection process.

As shown in FIG. 5C, when the gate electrode 121 is formed, the gate line 116 is formed substantially vertical to the data line 117. In the first embodiment of the present invention, when the first insulation film 115A is formed relatively thick on the upper portion of the data line 117, a signal interference can be prevented at an intersection of the data line 117 and the gate line 116.

Figure 4D:
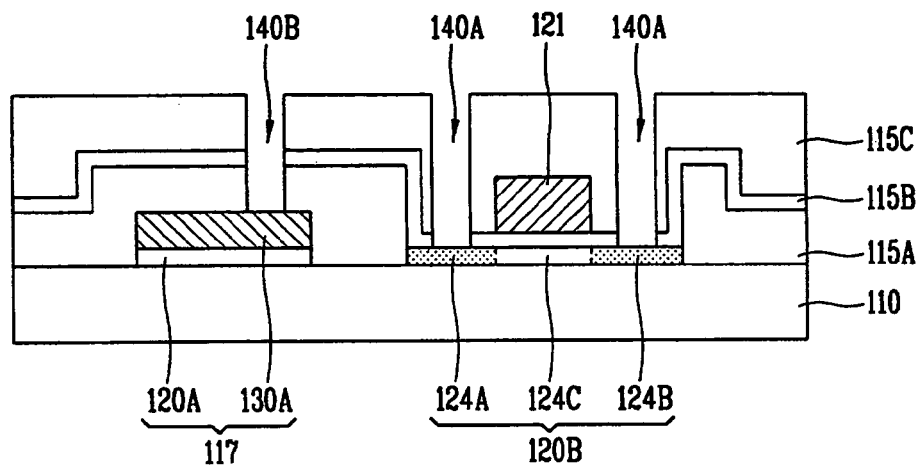
Figure 5D:
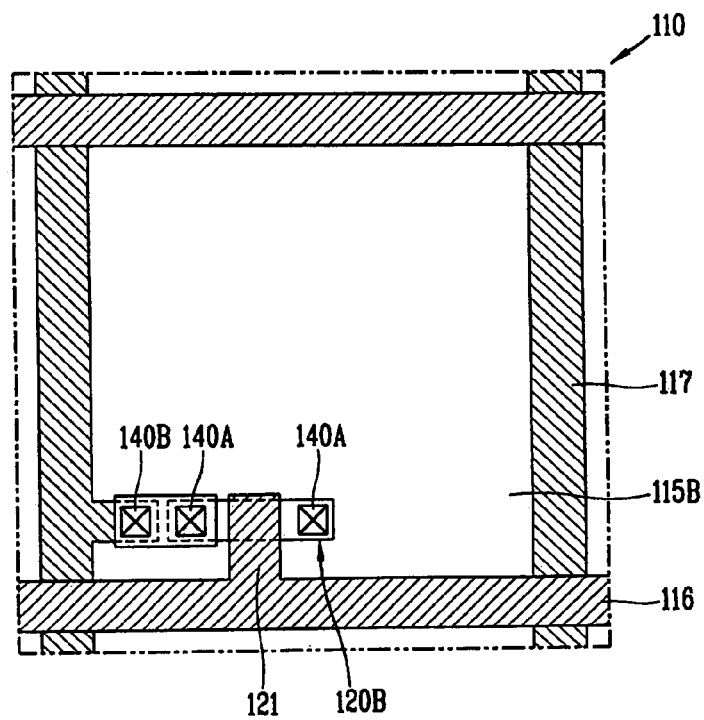

Next, as shown in FIGS. 4D and 5D, the third insulation film 115C is disposed on the entire surface of the substrate 110 where the gate electrode 121 has been formed. Then, a portion of the second insulation film 115B and the third insulation film 115C are removed through photolithography to define a plurality of first contact holes 140A to expose a portion of the source/drain regions 124A and 124B. A portion of the first, second and third insulation films 115A, 115B and 115C are removed to define the second contact hole 140B, thereby connecting the source region 124A and the data line 117 electrically. The third insulation film 115C is formed of a transparent organic insulation material such as benzocyclobutene (BCB) or an acrylic resin for a high aperture ratio.

Figure 4E:
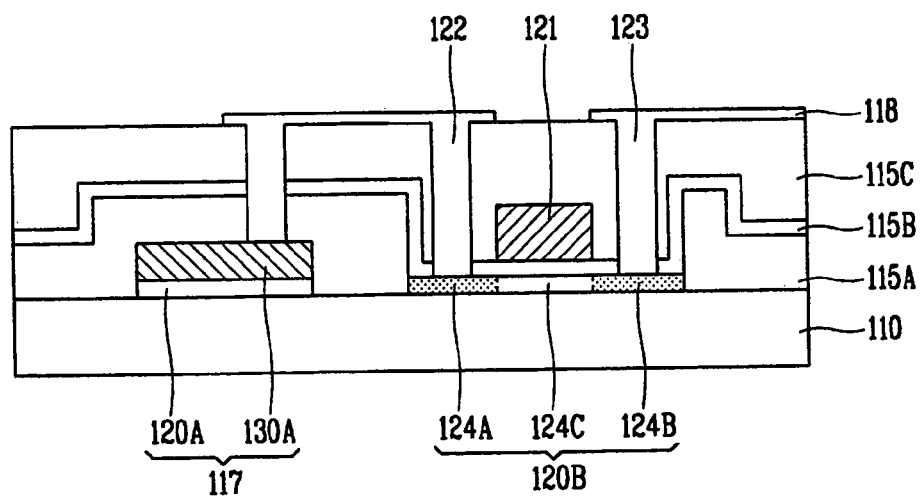
Figure 5E:
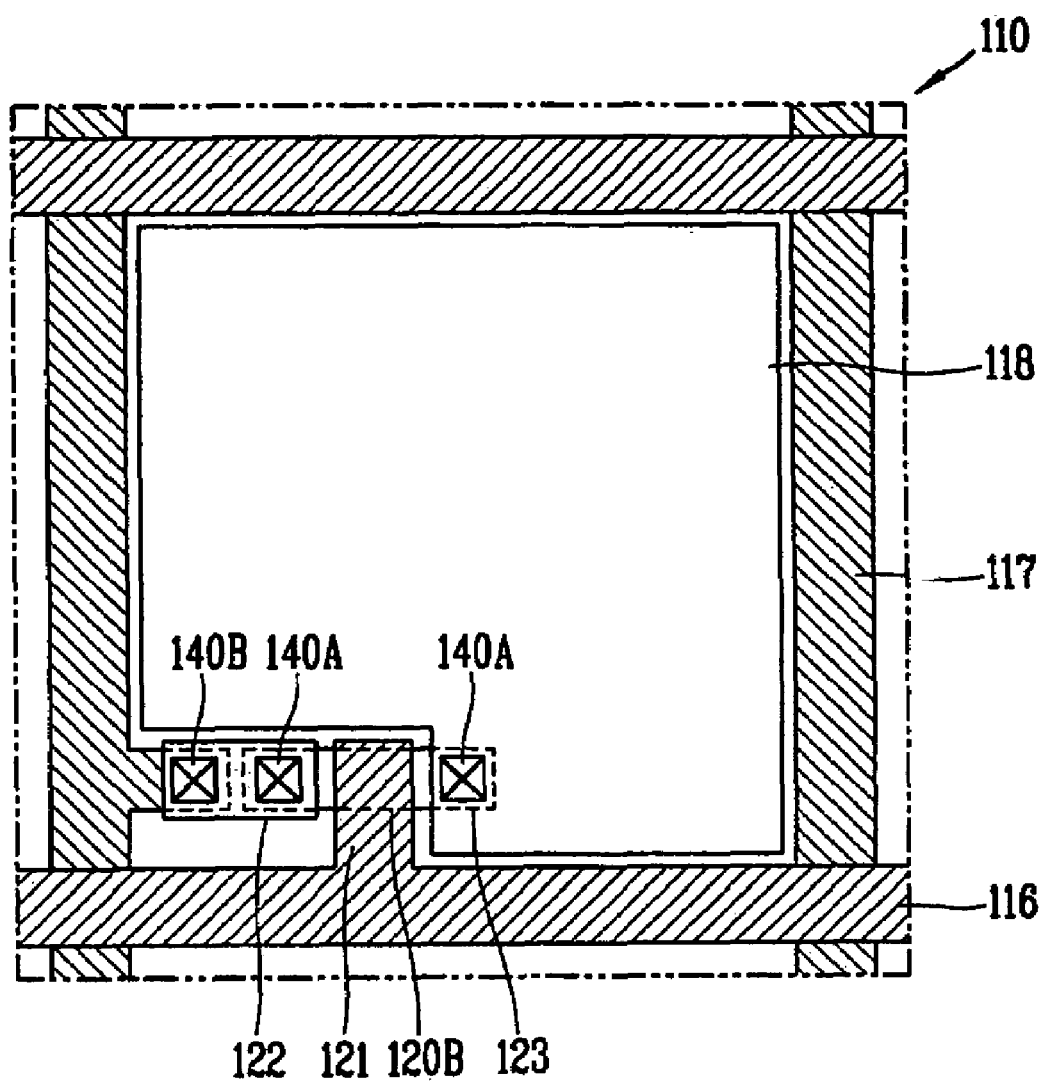

Then, as shown in FIGS. 4E and 5E, after a transparent conductive material having an excellent transmittance such as ITO (Indium Tin Oxide) or an IZO (Indium Zinc Oxide) is disposed on the entire surface of the substrate 110. At this time, a portion of the source electrode 122 is electrically connected to the data line 117 within the second contact hole 140B, and a portion of the drain electrode 123 is extended into the pixel region to form the pixel electrode 118. Furthermore, the source electrode 122 is electrically connected to the source region 124A within the one of the plurality of first contact holes 140A and the drain electrode 123 is electrically connected to the drain region 124B within the other one of the plurality of first contact holes 140A.

As mentioned above, in the fabrication process of the LCD in accordance with the first embodiment of the present invention, the active pattern 120B and the data line 117 are simultaneously patterned to define the first and second contact holes in one masking process, thus number of masking process is reduced compared to the fabrication process of the related art. Accordingly, increased production yield and a reduction of fabrication cost are achieved.

Meanwhile, a one-time masking process for patterning the active pattern 120B and the data line 117 simultaneously can be further reduced using a diffraction exposure and ashing technique. Diffraction exposure and ashing technique will now be described in a second embodiment of the present invention.

FIGS. 7A to 7D are cross-sectional views sequentially showing a fabrication process of an LCD in accordance with the second embodiment of the present invention.

Figure 7A:
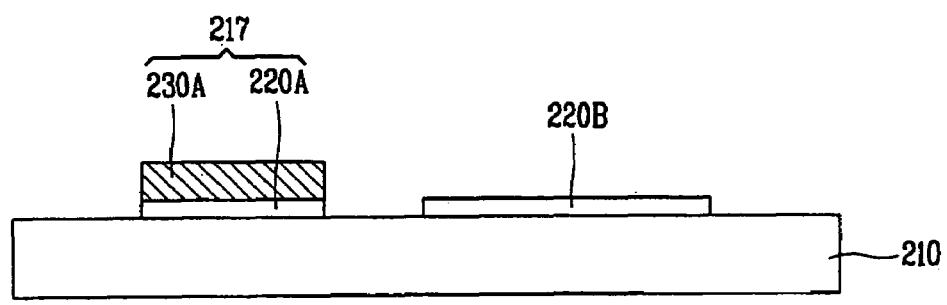
FIGS. 7A to 7D are cross-sectional views showing step-by-step fabrication process of an LCD in accordance with a second exemplary embodiment of the present invention.

As shown in FIG. 7A, the active pattern 220B and the data line 217 are simultaneously formed on a substrate 210 using photolithography (the first masking process). The substrate 210 is made of a transparent insulation material such as glass. In the second embodiment of the present invention, the one-time masking process including the diffraction exposure and ashing process is implemented to form the active pattern 220B and the data line 217. In the one-time masking process of the second embodiment, a conductive metal material is absent from the upper portion of the active pattern 220B, while the data line 217 and the active pattern 220B are formed.

Figure 8A:
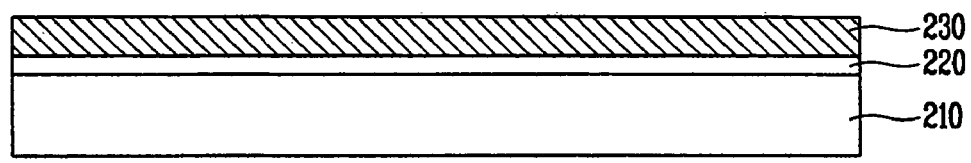
FIGS. 8A to 8D are cross-sectional views showing a process of simultaneously forming an active pattern and a data line using a diffraction exposure in accordance with the second embodiment of the present invention.
Figure 8B:
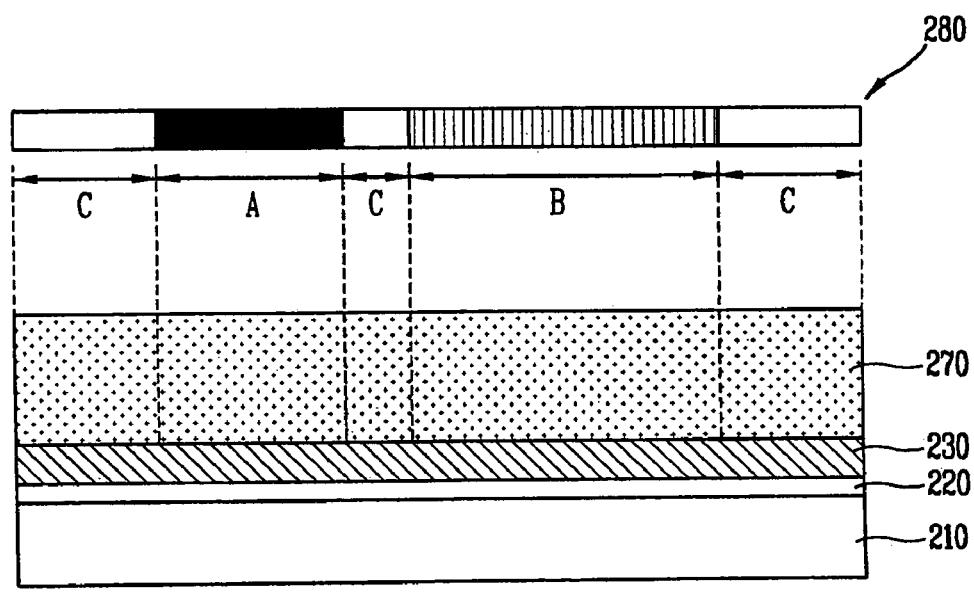

The details of the one-time masking process in the second embodiment will be described with reference in FIGS. 8A and 8D. FIGS. 8A to 8D are cross-sectional views showing a process of simultaneously forming an active pattern and a data line by using a diffraction exposure.

As shown in FIG. 8A, a conductive metal material 230 forming a data line is disposed on the entire surface of the substrate 210 where a silicon layer 220 has already been disposed. Next, as shown in FIG. 8B, a photosensitive film 270 formed of a photosensitive material such as photoresist is disposed on the entire surface of the substrate 210 already provided with the conductive metal material 230.

The photoresist includes a positive photoresist and a negative photo resist. The positive photoresist comprises a group of a Novolak based resin, wherein a region exposed to light source is dissolved in reaction with a developer. The negative photoresist comprises an acryl based monomer wherein an exposed region is not reacted with the developer. The photoresist further comprises a solvent serving to adjust viscosity, a photo active-based compound causing photo-sensing and a resin, and a chemically coupled material.

Thereafter, a diffraction mask 280 is positioned on the substrate 210 which is already provided with the photosensitive film 270 and photo-sensing is performed by light such as ultraviolet rays. In the second embodiment of the present invention, the positive photoresist is used as a photosensitive film 270. However, a choice of photoresist for a photosensitive film is not limited to the positive photoresist only. The negative photoresist can be also used as a photosensitive film, and other suitable photosensitive material other than the photoresist can be also used.

While using the positive photoresist, the first region (A) is completely covered to leave the photoresist as it is (leaving the relatively thick photosensitive film), the second region (B) has a slit pattern to form a relatively thin photoresist, and the third region (C) is removed, thereby forming a diffraction mask 280 including a slit pattern. The slit pattern serves to reduce strength of light incident on the substrate 210 by making the incident light diffracted. The slit pattern has a slit interval suitable for diffraction exposure. A slit interval narrower than resolution of an optical source is used for photo-sensing. In the second embodiment of the present invention, the slit pattern is used for the second region (B), but a semi-transmission film can be also used.

As fabrication process proceeds using the diffraction mask 280, a first photoresist pattern 270A having a first thickness remains at the first region (A), a second photoresist pattern 270B having a second thickness thinner than the first photoresist pattern 270A remains at the second region (B), and the photoresist is completely removed at the third region (C).

Figure 8C:
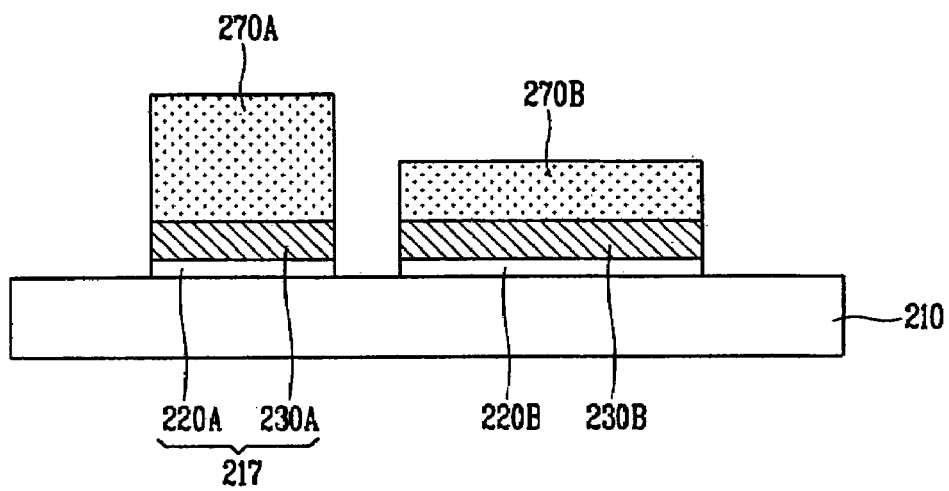
Figure 8D:
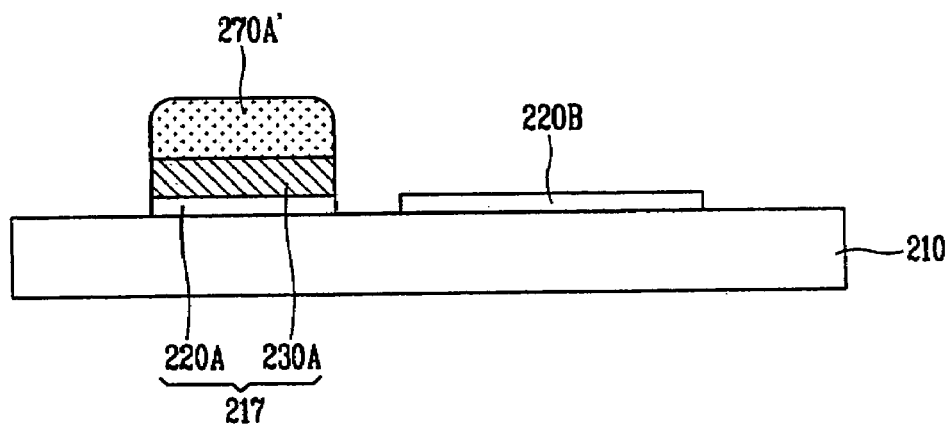

As shown in FIG. 8C, the conductive metal material 230 and the silicon layer 220 disposed at the third region (C) where photoresist pattern 270A and 270B are absent are removed to form the active pattern 220B and the data line 217. The data line 217 includes the first data line pattern 220A formed of the silicon layer which also forms the active pattern 220B, and the second data line pattern 230A made of a conductive metal material. The conductive metal material pattern 230B remains on the upper portion of the active pattern 220B.

As a reference, the etching technique is a method for implementing a desired thin film pattern by selectively removing a portion of the thin film formed by photoresist using a physical or chemical reaction. In the etching process, a portion of the thin film where the photoresist pattern is absent is removed. The etching process includes dry etching using gas plasma and wet etching using a chemical solution.

As shown in FIG. 8D, a process of removing a portion of the first photoresist pattern 270A having the first thickness is performed. To remove a portion of the first photoresist pattern 270A, the ashing technique is used. The ashing technique oxidizes the photosensitive film by a gas, for example, oxygen. At this time, the first photoresist pattern 270A having the first thickness disposed on the upper portion of the data line 217 is precisely controlled by the ashing method. A portion of the first photoresist pattern 270A is removed to form the third photoresist pattern 270A' having the third thickness while the second photoresist pattern 270B disposed on the upper portion of the active pattern 220B is completely removed, thereby exposing the conductive metal material pattern 230B. Thereafter, the conductive metal material pattern 230B is removed using the third photoresist pattern 270A' having the third thickness as a mask, to expose the surface of the active pattern 220B.

Figure 7B:
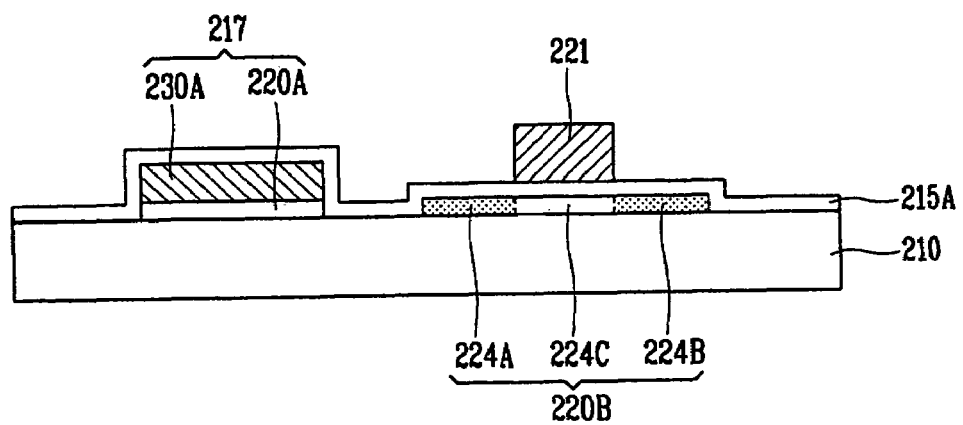

Next, as shown in FIG. 7B, the first insulation film 215A is disposed on the entire surface of the substrate 210. After a gate electrode 221 formed of a conductive metal material is disposed at an upper portion of the active pattern 220B which is already provided with the gate insulation film 215A (the second masking process), an impurity ion is injected to a certain region of the active pattern 220B using the gate electrode 221 as a mask to form a source region 224A and a drain region 224B.

Figure 7C:
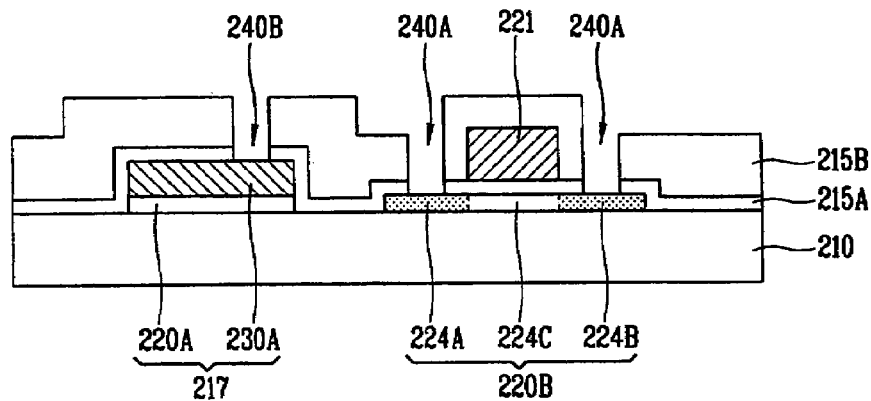
Figure 7D:
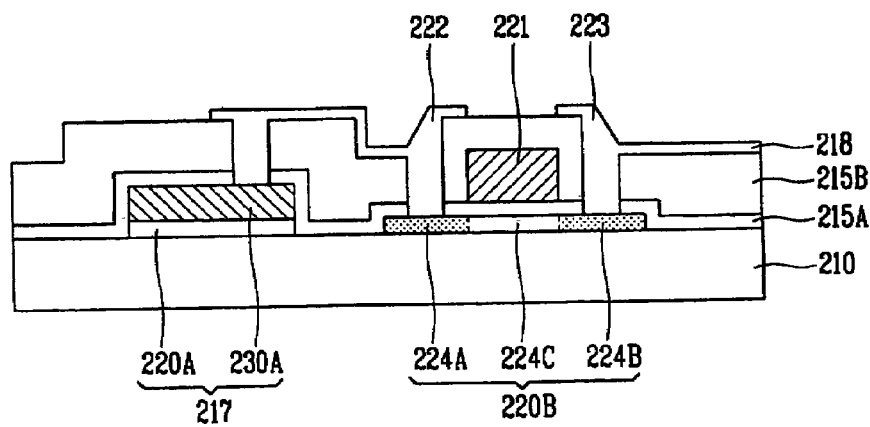

As shown in FIG. 7C, the second insulation film 215B is disposed at the entire surface of the substrate 210 where the gate electrode 221 is formed, then, a portion of the second and first insulation films 215B and 215A is removed through photolithography (the third masking process) to define a plurality of first contact holes 240A and a second contact hole 240 B. The plurality of first contact holes 240A exposes a portion of the source/drain regions 224A and 224B, and a second contact hole 240B exposes the second data line pattern. Thereafter, as shown in FIG. 7D, a transparent conductive metal material is disposed on the entire surface of the substrate 210.

At this time, a portion of the source electrode 222 is electrically connected to the data line 217 within the second contact hole 240B and a portion of the drain electrode 223 is extended into the pixel region to form the pixel electrode 218. A source electrode 222 electrically connects with the source region 224A within one of the plurality of first contact holes 240A and a drain electrode 223 electrically connects with the drain region 224B within another one of the plurality of first contact holes 240A.

In this manner, the active pattern 220B and the data line 217 are formed through one-time masking process using the diffraction exposure and ashing technique. Since process of forming a contact hole is eliminated, two masking processes required to form the contact hole can be reduced compared with the fabrication process of the related art. Accordingly, higher production yield and reduction of a fabrication cost are achieved by the simplified fabrication process.

As described, the method for fabricating an LCD in accordance with the present invention has the following advantages. Since the active pattern and the data line are simultaneously patterned, total number of mask process is reduced. Thus, the fabrication process and cost can be reduced. In addition, since the pixel electrode extends directly from a portion of the drain electrode and the pixel electrode does not need a contact hole to electrically connected with the drain electrode, the number of fabrication process and cost are further reduced.

It will be apparent to those skilled in the art that various modifications and variations can be made in the liquid crystal display device and its fabricatng method thereof without departing from the spirit or scope of the invention. Thus, it is intended that the present invention cover the modifications and variations of this invention provided they come within the scope of the appended claims and their equivalents.

What is claimed is:
1. A method for fabricating a liquid crystal display (LCD) device, comprising:

forming an active pattern and a data line on a substrate, the active pattern including a source region, a drain region, and a channel region;

disposing a first insulation film on a portion of the substrate;

forming a gate electrode in a portion of the active pattern where the first insulation film is formed;

disposing a second insulation film on the substrate;

forming a plurality of first contact holes to expose a portion of the source and drain regions and a second contact hole to expose a portion of the data line;

forming a source electrode from a transparent conductive material connected to a source region within one of the plurality of first contact holes and a data line within the second contact hole; and forming a pixel electrode and a drain electrode from the transparent conductive material connected to a drain region within the other one of the plurality of first contact holes.

2. The method according to claim 1, further comprising, forming a gate electrode, and thereafter forming a source region and a drain regions by injecting an impurity ion to a certain portions of the active pattern using the gate electrode as a mask.

3. The method according to claim 2, wherein the impurity ion is a group V element.

4. The method according to claim 3, wherein the group V element is phosphorus.

5. The method according to claim 2, wherein the impurity ion is a group III element.

6. The method according to claim 5, wherein the group III element is boron.

7. The method according to claim 1, wherein a portion of the drain electrode is extended into a pixel region to form a pixel electrode.

8. The method according to claim 1, wherein the step of forming the active pattern and the data line comprises:

disposing a silicon layer on the substrate;

disposing a conductive metal layer on the silicon layer;

forming a photosensitive pattern defined by a first portion having a first thickness, a second portion having a second thickness and a third portion by applying a diffraction mask to the photosensitive film;

etching the conductive metal layer exposed by the third portion and the silicon layer disposed directly underneath the exposed conductive metal layer;

removing a portion of the photosensitive film, thereby leaving only the photosensitive film pattern of the first portion; and forming an active pattern and a data line by patterning the conductive metal layer using the photosensitive film pattern of the first portion as a mask.

9. The method according to claim 8, wherein the silicon layer is formed of a crystallized silicon thin film.

10. The method according to claim 8, wherein the first thickness is greater than the second thickness.

11. The method according to claim 8, wherein the first portion is a data line region.

12. The method according to claim 8, wherein the second portion is an active pattern region.

13. The method according to claim 8, wherein the step of removing a portion of the photosensitive film includes ashing.

* * * * *